(12) United States Patent
Simm et al.

(10) Patent No.: US 7,600,577 B2
(45) Date of Patent: Oct. 13, 2009

(54) DEVICE FOR SENSING THE DIRECTION OF ROTATION OF A HAND TOOL COMPRISING AN ELECTRIC MOTOR

(75) Inventors: Robert Simm, Oekingen (CH); Markus Weber, Bätterkinden (CH); Bernhard Roth, Bellach (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/616,078

(22) Filed: Dec. 26, 2006

(65) Prior Publication Data

US 2007/0152660 A1 Jul. 5, 2007

(30) Foreign Application Priority Data

Dec. 29, 2005 (DE) .................... 10 2005 062 862

(51) Int. Cl.
*G01B 7/30* (2006.01)
(52) U.S. Cl. .................... 173/2; 173/176; 173/181; 173/217; 173/20; 310/239; 310/50; 310/47; 310/244; 310/156.05; 310/156.06; 388/937; 324/207.2
(58) Field of Classification Search ............... 173/217, 173/2, 181, 20, 176; 310/68 B, 50, 47, 239–242, 310/244–245, 156.05, 156.06; 388/937; 324/207.2
See application file for complete search history.

(56) References Cited

U.S. PATENT DOCUMENTS

| 5,086,243 | A | * | 2/1992 | Hofmann ................. 310/68 B |
| 6,013,961 | A | * | 1/2000 | Sakamaki et al. ......... 310/68 B |
| 6,043,576 | A | * | 3/2000 | Weber et al. .............. 310/68 B |
| 6,091,171 | A | * | 7/2000 | Ohishi et al. .............. 310/68 B |
| 6,373,241 | B1 | * | 4/2002 | Weber et al. .............. 324/207.2 |
| 6,710,480 | B1 | * | 3/2004 | Baumeister et al. ....... 310/68 B |
| 7,064,462 | B2 | * | 6/2006 | Hempe et al. ................. 310/50 |
| 2004/0140724 | A1 | * | 7/2004 | Higuchi ................. 310/156.06 |
| 2007/0164619 | A1 | * | 7/2007 | Greene ..................... 310/68 B |
| 2007/0216241 | A1 | * | 9/2007 | Ortoman et al. ............... 310/71 |

FOREIGN PATENT DOCUMENTS

DE 103 58 569 7/2005
FR 2 557 352 6/1985

* cited by examiner

*Primary Examiner*—Rinaldi I. Rada
*Assistant Examiner*—Michelle Lopez
(74) *Attorney, Agent, or Firm*—Michael J. Striker

(57) ABSTRACT

A device for sensing a direction of rotation of a hand tool having an electric motor, has a rotatably supported brush plate provided in the electric motor and located in different positions depending on a direction of rotation of the electric motor; and at least one sensor which senses the different positions of said brush plate to determine a direction of rotation, wherein said sensor is configured as a contactless sensor.

12 Claims, 3 Drawing Sheets

DEVICE FOR SENSING THE DIRECTION OF ROTATION OF A HAND TOOL COMPRISING AN ELECTRIC MOTOR

CROSS-REFERENCE TO A RELATED APPLIACTION

The invention described and claimed hereinbelow is also described in German Patent Application DE 102005062862.1 filed on Dec. 29, 2005. This German Patent Application, whose subject matter is incorporated here by reference, provides the basis for a claim of priority of invention under 35 U.S.C. 119(a)-(d).

BACKGROUND OF THE INVENTION

The present invention relates to devices for sensing the direction of rotation of a hand tool comprising an electric motor.

More particularly, the present invention relates to a device for sensing the direction of rotation of a hand tool comprising an electric motor, in particular a rotary hammer or impact drill. The electric motor includes a rotatably supported brush plate which is located in different positions depending on the direction of rotation of the electric motor. The different positions are sensed using at least one sensor to determine the direction of rotation.

Devices of the type described initially are known. For example, there are rotary hammers and impact drills with an electric motor which includes a rotatable brush plate which serves to change the direction of rotation. In addition to increasing the service life of the carbon brushes of the electric motor, this results in optimal commutation and identical values for rotational speed and torque in right and left rotation. Compared with similar hand tools without a rotatable brush plate, the advantage results here, e.g., that screws which were screwed down using the electric hand tool can also be removed using the same hand tool.

To provide information about the direction of rotation of the electric motor, limit switches are installed in modern systems, which forward information about the position of the rotatable brush plate to the electronics. A device of this type requires complex engineering to manufacture, and certain tolerances must be very narrow in order to ensure functionality.

SUMMARY OF THE INVENTION

Accordingly, it is an object of the present invention to provide the device for sensing the direction of rotation of a hand tool with an electric motor which is a further improvement of the existing devices.

The inventive device has the advantage that a contactless sensor is provided instead of a mechanical limit switch, the use of which is relative complex due to the narrow tolerances required.

The contactless sensor is advantageously switched via a magnetic field. Since a magnetic field has a certain propagation, usage does not require tolerances which are this narrow. This results in easier use and lower costs.

In a refinement of the present invention, a Hall sensor and/or a reed relay are provided as the contactless sensor. When a magnetic field acts on a Hall sensor, for example, and when current flows through the Hall sensor, it delivers an output voltage (Hall voltage) which is proportional to the product of the magnetic field strength and the current. An electronic device connected thereto can detect a change in voltage in the Hall sensor and trigger a reaction—which is related to the voltage—in a system.

The sensor is advantageously located in an existing electronics module of the hand tool. This allows the Hall sensor to be connected to the electronics in the easiest manner possible, without the need to guide further electrical lines through a housing in the hand tool.

It is also advantageous when the electronics module or the sensor is located outside of the electric motor and inside the hand tool.

In a refinement of the present invention, at least one magnet is assigned to the rotatably supported brush plate, which produces the magnetic field required to switch the sensor. By assigning the magnet to the rotatable brush plate, the magnetic field can be registered at a fixed point as soon as the magnet approaches the fixed point due to the movement of the brush plate. It is therefore possible to detect different positions of the brush plate, e.g., depending on the field strength or Hall voltage that were measured.

It is also advantageous when a lever is assigned to the magnet, which is connected with the brush plate such that it indicates the position of the brush plate, i.e., the lever has a certain position for every angle of rotation of the brush plate. To this end, the lever is connected with the brush plate via a joint, or it is fixedly mounted thereon. If the lever and brush plate are interconnected via a joint, the lever must be supported in a fixed position. The bearing point on the lever is located between the magnet and the joint, or at the end of the lever opposite to the joint, so that the magnet is located between the joint and the bearing point.

It is also advantageous when the sensor is activated in only one direction of rotation of the electric motor via the position of the brush plate or the magnet located on the lever. The electronics can therefore decide in which direction the electric motor is rotating: When it is rotating in one direction, the brush plate is rotated in a certain direction and the lever is in a position in which the magnet is located in front of the Hall sensor and activates it. When the electric motor rotates in the other direction, the magnet or the lever move away from the sensor and the magnet no longer acts on the sensor. Right-hand rotation can therefore be assigned to the activated sensor, and left-hand rotation can be assigned to left-hand rotation.

In a refinement of the present invention, the direction of rotation which was sensed via a change in voltage in the Hall sensor is displayed to the user via at least one visual and/or acoustic signal. This results in handling advantages for the hand tool, in that the user is informed about the direction of rotation in an unequivocal and quickly recognizable manner.

It is also advantageous when the magnet used is a permanent magnet. As a result, the necessary magnetic field can be produced as easily and economically as possible.

An electric hand tool—a rotary hammer or impact drill, in particular—with the inventive device for determining the direction of rotation using a Hall sensor is also advantageous which has one or more of the features described in the subclaims.

The novel features which are considered as characteristic for the present invention are set forth in particular in the appended claims. The invention itself, however, both as to its construction and its method of operation, together with additional objects and advantages thereof, will be best understood

DESCRIPTION OF THE PREFERRED EMBODIMENTS

Figure 1:
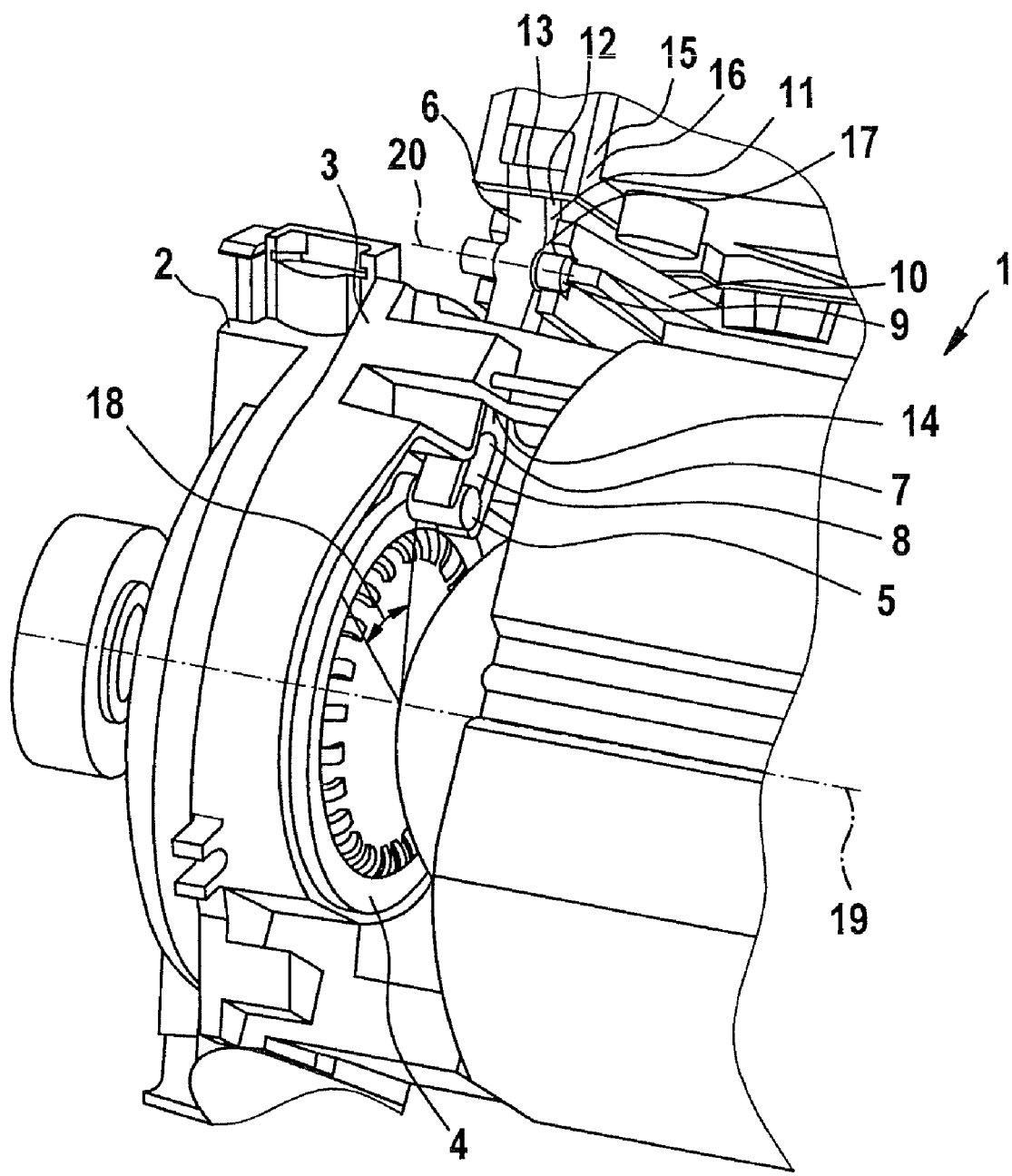
FIG. 1 shows an electrical machine with the inventive device.
Figure 3:
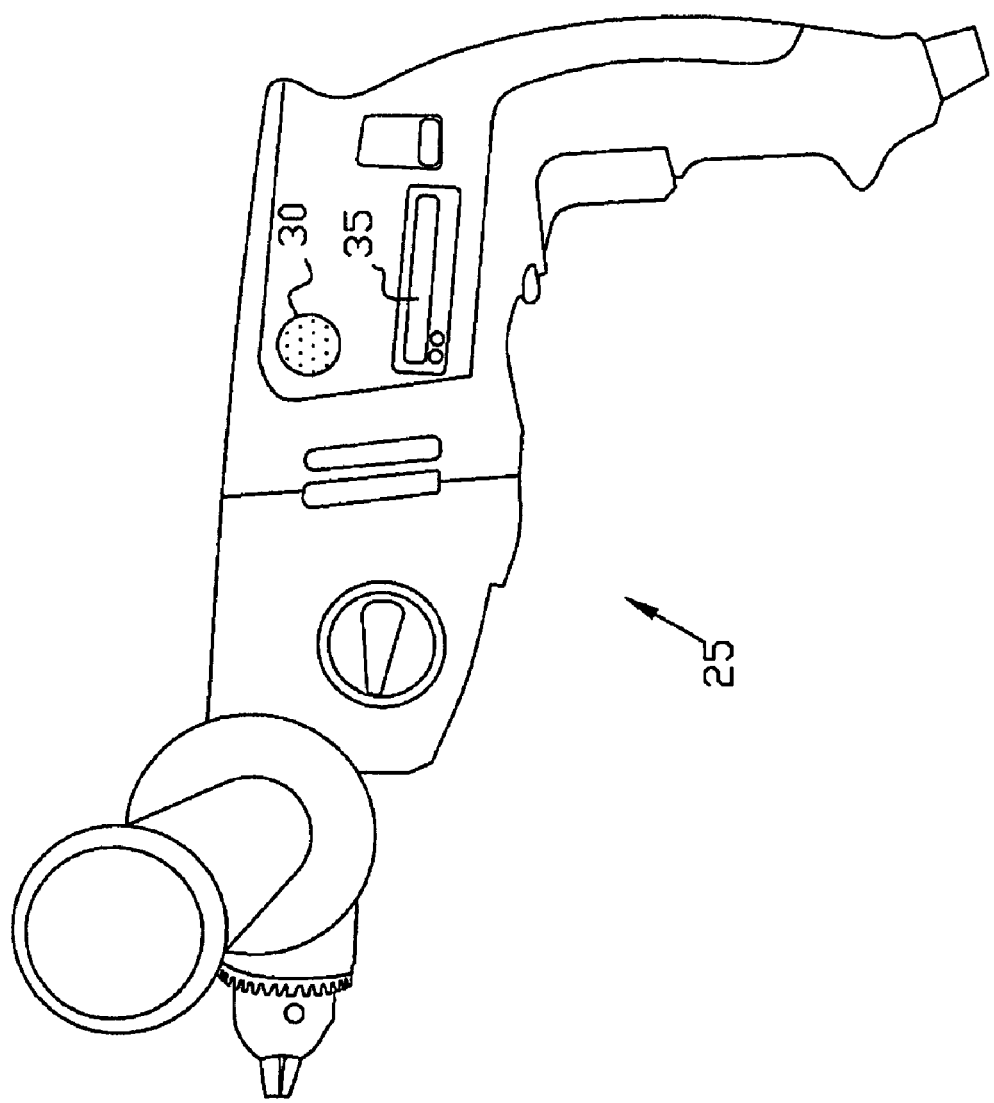
FIG. 3 shows a perspective view of a hand tool in accordance with the present invention.

It should be noted that, in the drawings, some components of the hand tool 25 shown in FIG. 3 were not depicted or only in a very basic manner, so that the illustrations are clear. FIG. 1 shows electric motor 1 with an essentially cylindrical brush plate 2 mounted thereon which is partially located—with a part facing the electric motor—in a cylindrical bearing 3 and includes an orthogonally projecting element 5 on side 4 facing electric motor 1.

A lever 6 is also shown, in one end 7 of which a recess 8 is formed in which element 5 is guided and which is supported in a bearing 9 of a housing part 10 of the hand tool in a rotatable or tiltable manner.

It includes—on its end 11 extending past bearing 10—a device, which is depicted here as a recess, for housing and retaining a magnet 13.

A radial opening 14 is formed in the circumference of bearing 3, through which lever 6 is guided. An electronics module with a not-shown contactless sensor 16 (designed as a reed relay or a Hall sensor) installed therein is located in a further housing part 10 at a distance from side 17 of lever 6, so that sensor 16 is located on the radius of motion of magnet 13 mounted on lever 6.

Figure 2:
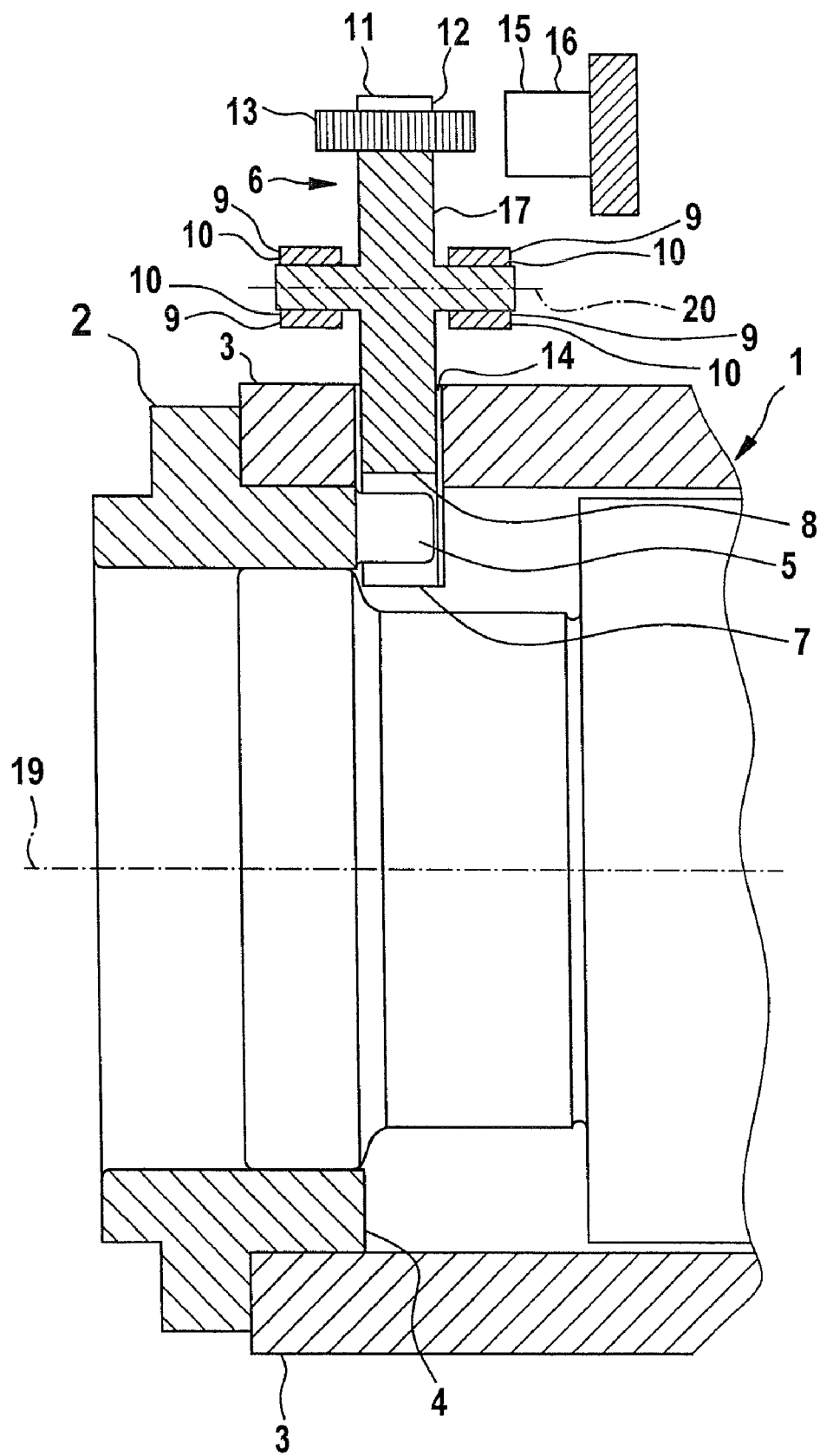
FIG. 2 shows a detailed view of the inventive device.

FIG. 2 shows a detained view of the inventive device which serves to enhance understanding of FIG. 1 and requires no further explanation.

To obtain identical values for rotational speed and torque in right rotation and left rotation, brush plate 2 can be rotated around its axis of rotation 19 by a certain angle 18. Projecting element 5 which is guided in to recess 8 of lever 6 causes lever 6 to tilt around its bearing axis 20 and causes magnet 13 to change its position such that, e.g., when electric motor 1 rotates in the right-hand direction and brush plate 2 rotates accordingly, it is located relative to sensor 16 such that it activates it, and when electric motor 1 rotates in the left-hand direction and brush plate 2 and lever 6 are therefore in a different position, it does not affect sensor 16.

Electronics module 15 converts the signal transmitted by sensor 16 and delivers it to a visual display 35 and/or, alternatively, to an acoustic signal for a sound emitter 30 via which the direction of rotation of the rotary hammer or impact drill is displayed to the operator.

Due to the simple design of the device for detecting the direction of rotation using a contactless sensor, it is possible to provide the user with information about the direction of rotation in an economical manner and with a relatively simple design, mainly in terms of the tolerances described above which are required when a mechanical limit switch is used.

It will be understood that each of the elements described above, or two or more together, may also find a useful application in other types of constructions differing from the type described above.

While the invention has been illustrated and described as embodied in a device for sensing the direction of a hand tool comprising an electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for sensing a direction of rotation of an electric motor in a hand tool, said device comprising:
   a rotatably supported brush plate engageable with said electric motor, wherein said brush plate is rotatable to different angular positions about its rotational axis depending on a direction of rotation of said electric motor;
   at least one sensor for sensing said different angular positions of said brush plate to determine said direction of rotation of said electric motor of said hand tool, wherein said sensor is configured as a contactless sensor that is activated by exposure to a magnetic field of
   at least one magnet, wherein said at least one magnet is mechanically linked to said rotatably supported brush plate; and
   a lever whereon said at least one magnet is disposed, wherein said lever is actuated by said brush plate so that when said brush plate is rotated said lever is displaced and said magnet changes its position.

2. A device as defined in claim 1, wherein said sensor is configured as a Hall sensor.

3. A device as defined in claim 1, wherein said sensor is configured as a reed relay.

4. A device as defined in claim 1 further comprising an electronics module, said sensor being located in said electronics module.

5. A device as defined in claim 4, wherein said electronics module is located outside said electric motor and inside said hand tool.

6. A device as defined in claim 1, wherein said lever including said magnet is shifted into proximity with said sensor by a change in said angular positions of said brush plate upon rotation of said electric motor in only one direction.

7. A device as defined in claim 1 further comprising means for displaying said direction of rotation being sensed to a user, wherein said means for displaying is configured to receive at least one visual signal.

8. A device as defined in claim 1 further comprising means for displaying said direction of rotation being sensed to a user, wherein said means for displaying is configured to receive at least one acoustic signal.

9. A device as defined in claim 1 wherein said at least one magnet is a permanent magnet.

10. An electric hand tool comprising:
    an electric motor including a rotatably supported brush plate, wherein said brush plate is rotatable about its axis to different positions based on a direction of rotation of said electric motor;
    at least one magnet, wherein said at least one magnet is mechanically linked to said rotatably supported brush plate;
    a lever whereon said at least one magnet is disposed, wherein said lever is actuated by said brush plate so that when said brush plate is rotated said lever is displaced and said magnet changes its position; and at least one sensor for sensing said different positions of said rotatably supported brush plate to determine a direction of rotation of said electric motor, said at least one sensor being configured as a contactless sensor that is activated by exposure to a magnetic field of said magnet.

11. An electric hand tool as defined in claim 10, wherein said electric hand tool is a rotary hammer.

12. An electric hand tool as defined in claim 10, wherein said electric hand tool is an impact drill.

* * * * *